July 19, 1927.
H. P. NIELSEN
WHEEL
Filed March 23, 1927
1,636,483
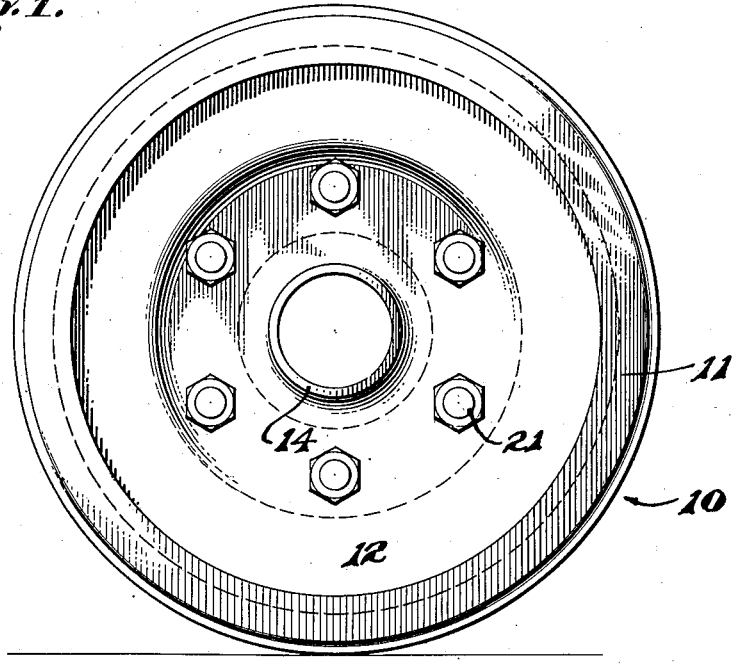
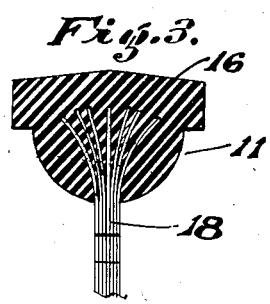
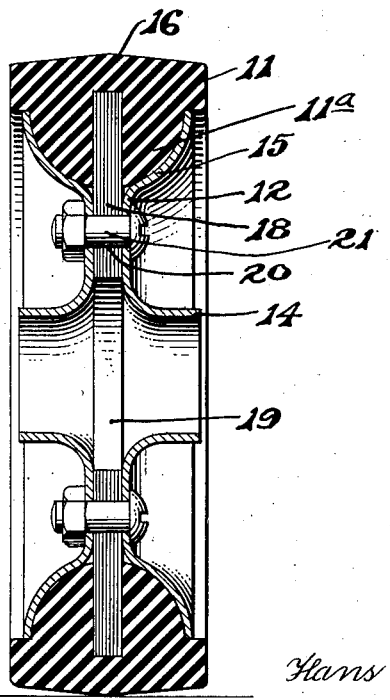
INVENTOR.
Hans P. Nielsen
BY
Townsend Loftus and Abbett
ATTORNEYS.

Patented July 19, 1927.

1,636,483

UNITED STATES PATENT OFFICE.

HANS P. NIELSEN, OF ALAMEDA, CALIFORNIA, ASSIGNOR TO EAMES COMPANY, OF SAN FRANCISCO, CALIFORNIA, A CORPORATION OF CALIFORNIA.

WHEEL.

Application filed March 23, 1927. Serial No. 177,589.

This invention relates to vehicle wheels and particularly pertains to an improved caster wheel.

Prior to my invention wheels of the type referred to have been provided with circumscribing resilient tires formed of rubber which were assembled on the wheels in either one of two different ways. One manner of arranging the tire on the wheel was to form the wheel in two complementary halves, forming a semi-circular rim section which engaged the lower or inner periphery of the tire and clamp the same to the wheel. In this type of wheel the clamping action of the rim on the tire was solely depended upon to keep the tire from creeping circumferentially of the wheel, and from flexing off of the rim when heavy loads and side thrust was imposed on the wheel.

A second wheel was formed wherein the tire was provided with an annular core of relatively slight resiliency and the inner circumference of the tire slight less in diameter than the rim so that the tire would be stretched and would, due to its inherent resilient qualities, frictionally engage the rim. Thus, both the clamping action and the friction between the tire and the rim was depended upon to obviate creeping and transverse flexing.

It has been found that the above methods have not proven entirely satisfactory due to the fact that the tires would creep and side flex under extremely heavy loads, and therefore, it is the principal object of the present invention to overcome the short comings of these prior wheels and provide a generally improved caster wheel of simple and inexpensive construction which may be expeditiously assembled and wherein the tire is connected to the wheel structure in such a manner as to entirely obviate creeping of the tire circumferentially of the rim or flexing transversely off of the rim when a heavy load and side thrust is imposed upon the wheel.

In carrying out this invention into practice, I provide a wheel structure including a tire having a tread portion, a rim portion and a central web formed as integral parts of the tire. A pair of complementary disks forming the wheel are arranged on each side of the tire and are formed with rim sections adapted to tightly embrace the rim section of the tire. These disks are arranged in physical contact with the web portion of the tire and are securely clamped thereto by bolts or other suitable fasteners.

One form which the invention may assume is exemplified in the following description and illustrated by way of example in the accompanying drawings, in which:

Fig. 1 is a side elevation of an improved wheel constructed in accordance with my present invention.

Fig. 2 is a central vertical section through the wheel disclosing the construction of the tire and the manner in which it is firmly secured to the wheel structure.

Fig. 3 is a transverse section through the tire showing a modified manner in which the web is embedded therein.

Referring more particularly to the accompanying drawings 10 indicates a wheel composed of three component parts. These parts are a tire 11 and a pair of oppositely disposed disks 12. These disks are formed at their centers with complementary hubs 14 for receiving a suitable ball bearing structure. As this latter forms no part of my present invention, it is not here shown, as any suitable bearing structure may be employed.

The exterior peripheral edges of the disks 12 are formed with complementary arcuate rim sections 15 to receive and embrace the rim portion 11ª of the tire. The rim formed by the two arcuate rim sections of the disks is substantially semi-circular in cross section being formed on a radius struck from a point located centrally between the disks and on a plane aligned with the outer marginal edges of the disks.

Reference being had to Fig. 2 it is seen that the tire 11 is composed of a wide tread 16, the rim section 11ª which conforms in cross section to the rim formed by the disks 12, and a central web 18. This web 18 is in the form of a disk having a central opening 19 aligning with the hubs of the disks. The web 18 is located concentrically with respect to the tire and disks and is of a diameter slightly smaller than the diameter of the tread of the tire so that the outer portion of the web will be firmly embedded in the rim and tread portions of the tire and form an integral part thereof.

It should be stated here that the tire is formed of rubber while the web 18 is formed of rubberized fabric which is flexible to a certain extent. In constructing the tire, the web 18 is placed centrally in the mould and the tire is formed around it and vulcanized under pressure to it, so that the web will form an integral part of the tire and be arranged concentrically therewith. The web 18 serves several purposes, one being that it firmly connects the tire to the wheel structure, and secondly, it acts as a spacer between the metallic disks 12.

In carrying out my invention into practice, the disks 12 are formed of pressed metal and the tire is constructed substantially as described. The disks and web 18 are formed with aligned bolt holes 20 through which bolts 21 are disposed to firmly clamp the disks 12 to the tire with the rim sections of the disks tightly embracing the rim section 11ª of the tire. As the web 18 is an integral part of the tire and is bolted to the disks 12, the tire cannot possibly creep circumferentially of the wheel nor flex transversely off of the wheel when the latter is subjected to a heavy load and side thrust.

In Fig. 3 of the drawings I have shown a modified form of tire construction which differs from that shown in Fig. 2 only in the manner in which the outer peripheral edge of the web 18 is embedded in the tread section of the tire. It will be noticed that in Fig. 3 the different layers of fabric or cord which comprise the web 18 are flared where they are embedded in the tread portion of the tire. This flaring of the layers of cord or fabric more firmly unites the tread section and the web section of the tire.

From the foregoing it is obvious that I have provided a wheel of simple and inexpensive construction, which is considerably improved over prior wheels and wherein the tire is so connected with the wheel structure that it cannot creep circumferentially of the wheel nor be removed from the wheel when a heavy load and side thrust is imposed on the latter.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A wheel comprising a pair of spaced disks forming a hub and a rim, said disks having spaced parallel portions between the rim and hub, a tire arranged on said rim, a central web formed as an integral part of the tire and extending between said parallel portions of the disks, and means firmly connecting the disks to said web.

2. A wheel comprising a pair of spaced disks forming a hub and a rim, a tire arranged circumferentially about the rim on the disks, a portion of said tire extending radially inwardly beyond the said rim, and bolts extending through the disks and said inwardly extending portion of the tire to firmly connect the disks to the tire.

3. A wheel comprising a pair of spaced disks forming a hub and a rim, a tire arranged circumferentially about the disks and embraced by the rim, a web formed as an integral part of the tire and disposed between the disks inwardly of the rim and in contact with the disks, and means firmly clamping the disks to said web.

4. A wheel comprising a pair of spaced disks forming a wheel structure having a rim, a tire seated on said rim, a web formed integrally with the tire and extending radially inwardly between the disks, and clamping means firmly clamping the disks to said web.

5. A wheel comprising a pair of spaced disks forming a wheel structure having a rim, a tire formed of resilient material arranged circumferentially of the wheel and seated on the rim, a central web formed of rubberized fabric embedded at its outer peripheral edge in the tire and extending radially inwardly between the disks beyond the rim, and clamping means extending through the disks and web to clamp the disks tightly against the web.

6. A wheel comprising a pair of spaced disks forming a rim and a hub, a tire having a rim portion adapted to seat in said rim, a tread portion on said tire extending circumferentially of the disks exteriorly thereof, a central web of rubberized fabric arranged concentrically with respect to the tire and having its outer peripheral portion embedded within the rim and tread sections of the tire and vulcanized thereto, said web extending radially inwardly beyond the rim section whereby it will be disposed between the disks, the portion of the disks intermediate the rim and hub being parallel and adapted to engage opposite sides of the web, and a plurality of fastening elements projecting through the disks and web to clamp the disks firmly to the web.

HANS P. NIELSEN.